No. 839,347.　　　　　　　　　　　　　　　　　PATENTED DEC. 25, 1906.
W. P. WARREN.
ROAD MAKING MACHINE.
APPLICATION FILED AUG. 27, 1906.
2 SHEETS—SHEET 1.
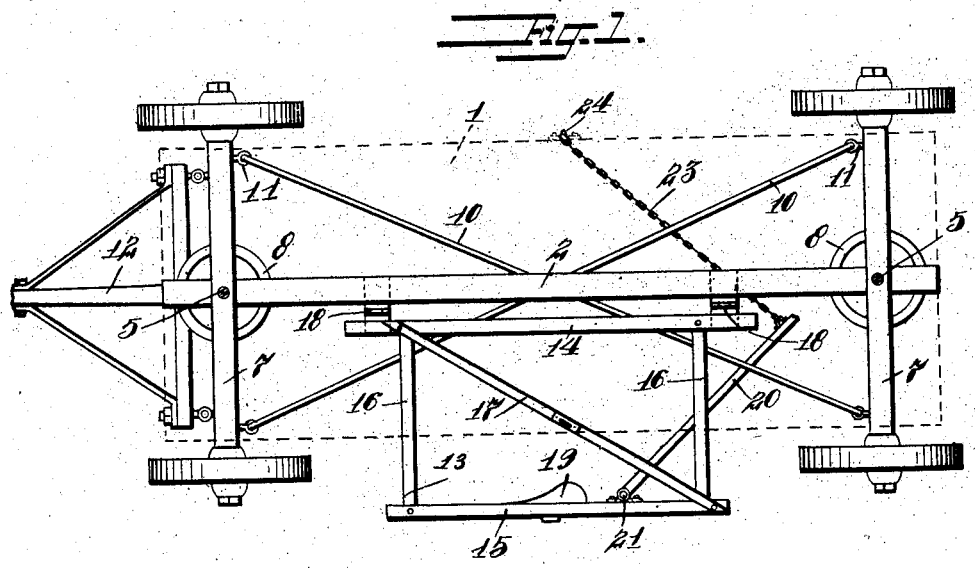
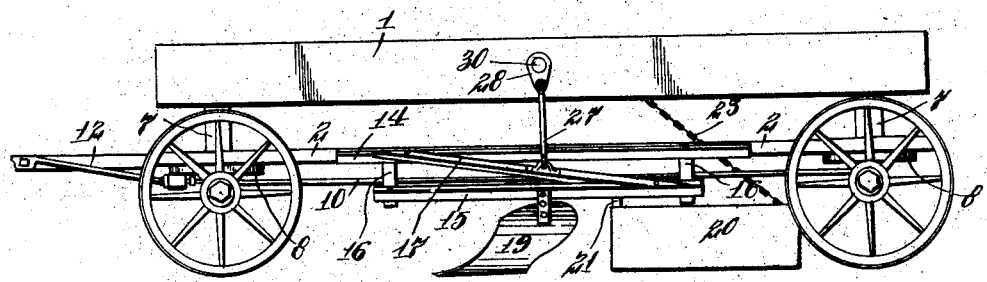
Witnesses　　　　　　　　　　　　　　Inventor
　　　　　　　　　　　　　　　　　William P. Warren
　　　　　　　　　　　　　　　　by
　　　　　　　　　　　　　　　　　　　　Attorneys No. 839,347. PATENTED DEC. 25, 1906.
W. P. WARREN.
ROAD MAKING MACHINE.
APPLICATION FILED AUG. 27, 1906.
2 SHEETS—SHEET 2.
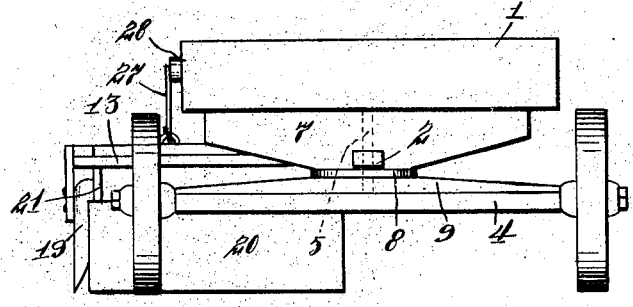
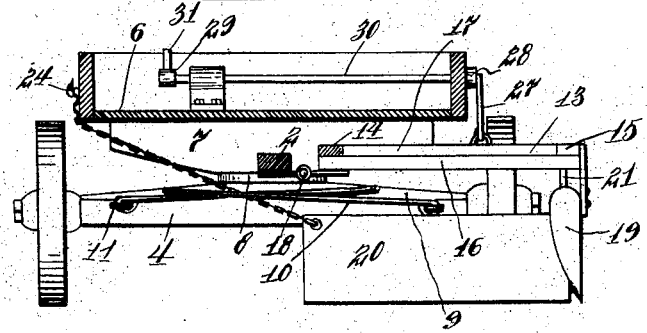
Witnesses
Inventor
William P. Warren
by
Attorneys

UNITED STATES PATENT OFFICE.

WILLIAM P. WARREN, OF SHERIDAN, ILLINOIS.

ROAD-MAKING MACHINE.

No. 839,347.　　　Specification of Letters Patent.　　　Patented Dec. 25, 1906.

Application filed August 27, 1906. Serial No. 332,251.

*To all whom it may concern:*

Be it known that I, WILLIAM P. WARREN, a citizen of the United States, residing at Sheridan, in the county of Lasalle and State of Illinois, have invented certain new and useful Improvements in Road-Making Machines; and I do declare the following to be a full, clear, and exact description of the invention, such as will enable others skilled in the art to which it appertains to make and use the same.

This invention relates to improvements in machines for making and repairing roads, ditches, and the like; and it consists in the novel construction, combination, and arrangements of parts herein described and claimed.

The object of the invention is to provide a simple, durable, and comparatively inexpensive machine of this character which may be adapted for a variety of uses and which is easy to handle and operate.

The above and other objects, which will appear as the nature of the invention is better understood, are accomplished by the construction illustrated in the accompanying drawings, in which—

Figure 1 is a top plan view of the improved machine, the top or platform of the truck being indicated in dotted lines. Fig. 2 is a side elevation of the same. Fig. 3 is a rear end elevation of the machine. Fig. 4 is a vertical transverse sectional view; and Fig. 5 is a detail view of the swinging frame, showing a scraper mounted thereon for making and filling ditches.

Referring to the drawings by numeral, 1 denotes a wagon or truck comprising a reach 2, to which are pivotally connected front and rear axles 3 and 4, having the usual supporting-wheels. Each of said axles is pivoted, as clearly shown in Fig. 3 of the drawings, upon a king-bolt 5, which passes through the platform or top 6 of the wagon, a bolster 7 upon the latter, a fifth-wheel or circular plate 8 upon one of said axles, and a bolster 9 upon the latter.

The rear axle 4 is connected to the front axle 3 by crossed diagonal rods 10, which have the eyes at their ends loosely engaged with eyebolts 11, provided in said axles. This connection between the axles causes them to move together and permit the wagon or truck to make a very short turn. A draft-pole or tongue 12 is connected to the front axle, as clearly shown in Fig. 1.

Mounted upon one side of the reach 2 is a vertically-swinging frame 13, consisting of inner and outer longitudinal bars 14 and 15, connected by end or cross bars 16 and by a diagonal brace 17. The ends of the bar 14 are extended, as seen in Fig. 1, and are connected to the reach 2 by hinges 18, so that the frame 13 may swing vertically. Said frame is adapted to carry one or more earth-working devices or implements, and, as shown in Figs. 1, 2, and 4 of the drawings, it carries a plow 19 and a scraper-blade 20. The plow 19 is of usual form and is suitably mounted upon the outer side bar 15 of the frame 13. The scraper-blade 20 is disposed in rear of the plow and has one of its ends mounted upon a vertical pivot 21, carried by the bar 15, so that said blade may be swung to any desired angle. It is adapted to be held in an adjusted angular position by a chain or other flexible connection 23, which has one of its ends attached to the free end of said blade and its other end adjustably secured, as at 24, upon the wagon body or platform 6.

If desired, the plow 19 and the blade 20 may be removed from the frame 13, and the scraper blade or board 25 may be substituted, as shown in Fig. 5 of the drawings. This device 25 is adapted for making and filling ditches and consists of a piece of timber of suitable length having a blade of suitable shape secured upon its outer end.

In order to vary the depth of the cut made by the plow and the scraper-blades and in order to elevate them to an inoperative position, the bar 17 of the frame 13 is connected by a link 27, which is also connected to a short arm 28 of a right-angular lever 29. The latter is pivoted at its angle upon a crossbar or shaft 30 upon the platform 6 and has its long arm provided with a handle 31.

The construction, operation, and advantages of the invention will be readily understood from the foregoing description, taken in connection with accompanying drawings. It will be seen that when the plow 19 and the blade 20 are mounted upon the swinging frame 13 and the machine is turned forwardly by draft-animals attached to the tongue 12 the plow will cut a ditch at one side of the rod, and the scraper-blade 20 will direct the dirt turned by the plow toward the center of the road, thereby filling the hollows and giving the road a proper pitch from its center to the ditch at its edge.

By arranging the plow, scraper-blades, and any other earth-working device upon the frame 13 it will be seen that the machine may be used for various purposes, such as making and repairing roads and ditches, elevating ground, filling ditches or hollow places, and the like.

Various changes in the form, proportion, and the minor details of construction may be resorted to without departing from the principle or sacrificing any of the advantages of this invention as defined by the appended claims.

Having described my invention, what I claim as new, and desire to secure by Letters Patent, is—

1. A machine of the character described comprising a reach, front and rear axles pivotally connected thereto and carrying supporting-wheels, crossed rods connecting said axles, and an earth-working device carried by said reach.

2. A machine of the character described comprising a reach, front and rear axles pivotally connected thereto and carrying supporting-wheels, crossed rods connecting said axles, a vertically-swinging frame mounted upon one side of said reach, and an earth-working device carried by said frame.

3. A machine of the character described comprising a reach, front and rear axles pivotally connected thereto and carrying supporting-wheels, crossed rods connecting said axles, a vertically-swinging frame hingedly mounted upon one side of said reach and carrying an earth-working implement, and means for raising and lowering said frame.

4. A machine of the character described comprising a reach, front and rear axles pivotally connected thereto and carrying supporting-wheels, crossed rods connecting said axles, a vertically-swinging frame hingedly mounted upon one side of said reach, carrying an earth-working implement, the shaft, a crank-arm thereon, and a link connecting said arm and said swinging frame.

In testimony whereof I have hereunto set my hand in presence of two subscribing witnesses.

WILLIAM P. WARREN.

Witnesses:
    F. G. AVUTZEN,
    F. T. CODY.